United States Patent
Itoh et al.

(10) Patent No.: US 12,351,194 B2
(45) Date of Patent: Jul. 8, 2025

(54) CONTROL DEVICE, CONTROL METHOD, STORAGE MEDIUM, MANAGER, AND VEHICLE

(71) Applicants: TOYOTA JIDOSHA KABUSHIKI KAISHA, Toyota (JP); ADVICS CO., LTD., Kariya (JP)

(72) Inventors: Nobuyuki Itoh, Toyota (JP); Shunsuke Arakawa, Miyoshi (JP); Shogi Fukukawa, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 258 days.

(21) Appl. No.: 17/676,933

(22) Filed: Feb. 22, 2022

(65) Prior Publication Data
US 2022/0266843 A1    Aug. 25, 2022

(30) Foreign Application Priority Data
Feb. 24, 2021 (JP) .................................. 2021-027486

(51) Int. Cl.
*B60W 50/00* (2006.01)
*B60W 30/06* (2006.01)
(Continued)

(52) U.S. Cl.
CPC ......... *B60W 50/0098* (2013.01); *B60W 30/06* (2013.01); *B60W 30/09* (2013.01); *B60W 30/12* (2013.01); *B60W 30/14* (2013.01)

(58) Field of Classification Search
CPC .. B60W 50/0098; B60W 30/06; B60W 30/09; B60W 30/12; B60W 30/14;
(Continued)

(56) References Cited

U.S. PATENT DOCUMENTS 11,644,834 B2 *   5/2023   Ditty .................. G06F 15/7807
                                                          701/23
2003/0225495 A1 * 12/2003   Coelingh ............. B60W 10/04
                                                          701/41
(Continued)

FOREIGN PATENT DOCUMENTS

JP     2008-55994 A      3/2008
JP     2009-18681 A      1/2009
(Continued)

*Primary Examiner* — Aniss Chad
*Assistant Examiner* — Chase L Cooley
(74) *Attorney, Agent, or Firm* — Oliff PLC

(57) ABSTRACT

A control device installed in a vehicle, the control device including one or more processors configured to: accept a plurality of first requests from a driver assistance system; perform arbitration of the first requests; calculate a second request that is a physical quantity that is different from the first requests, based on an arbitration result from the arbitration; calculate a third request that is the same physical quantity as the second request, based on a value realized by the vehicle and the first request; and distribute the second request and the third request to at least one of a plurality of actuator systems, wherein the one or more processors are configured to restrict calculation of the third request based on a predetermined condition.

4 Claims, 4 Drawing Sheets

(51) Int. Cl.
*B60W 30/09* (2012.01)
*B60W 30/12* (2020.01)
*B60W 30/14* (2006.01)

(58) Field of Classification Search
CPC ......... B60W 30/02; B60W 2050/0024; B60W 50/029; B60W 2050/0091; B60W 2050/0094; B60W 2050/022; B60W 2050/0297; B60W 2710/105; B60W 2720/106; B60W 10/04; B60W 10/10; B60W 10/18; B60W 10/20; B60W 30/08; B60W 2520/105
See application file for complete search history.

(56) References Cited

U.S. PATENT DOCUMENTS

| | | | |
|---|---|---|---|
| 2009/0048755 | A1 | 2/2009 | Tokimasa et al. |
| 2014/0365228 | A1* | 12/2014 | Ng-Thow-Hing ...... G06F 3/017 704/275 |
| 2020/0070802 | A1 | 3/2020 | Yamada |

FOREIGN PATENT DOCUMENTS

| | | | | |
|---|---|---|---|---|
| JP | 2019189063 A | * | 10/2019 | .............. B60T 8/175 |
| JP | 2020-032892 A | | 3/2020 | |

* cited by examiner

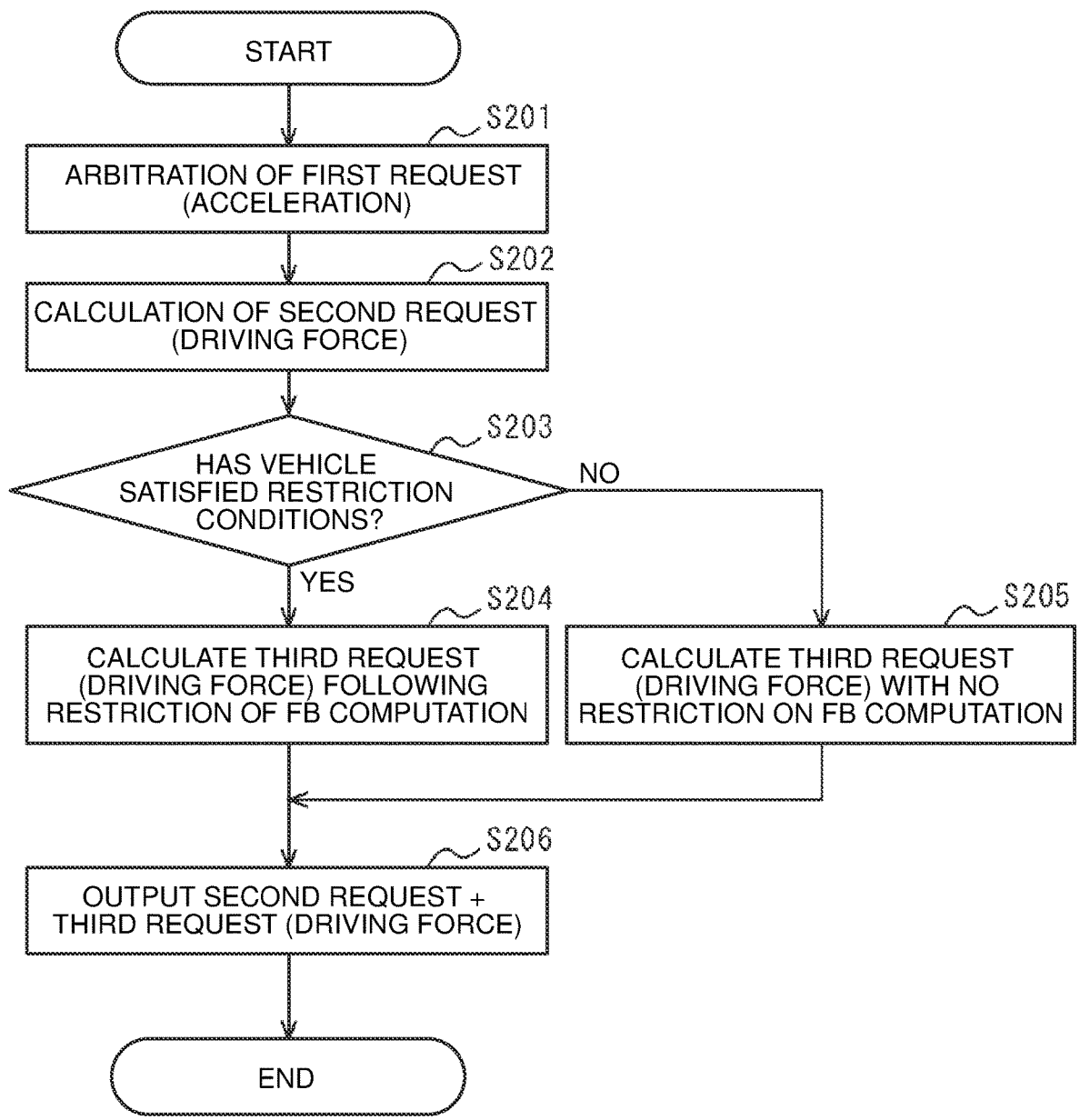

FIG. 3

| RESTRICTION CONDITIONS | | | RESTRICTION CONTENTS |
|---|---|---|---|
| NO ACTUATOR FAILURE | CAPABLE OF IMMEDIATE RESPONSE | VEHICLE STATE STABLE AND DRIVER OPERATIONS | [1] STOP COMPUTATION (ONLY FB TO REQUEST OBSTRUCTING DRIVER OPERATIONS) |
| | | VEHICLE STATE UNSTABLE | [2] STOP COMPUTATION |
| | NOT CAPABLE OF IMMEDIATE RESPONSE | VEHICLE IS NOT STOPPED | [3] LOWER GAIN (RESPONSE DELAY PERIOD) |
| | | VEHICLE IS STOPPED | [4] STOP COMPUTATION |
| ACTUATOR FAILED | NOT CAPABLE OF RESPONSE | — | [5] STOP COMPUTATION (ONLY FB TO FAILED ACTUATOR) |

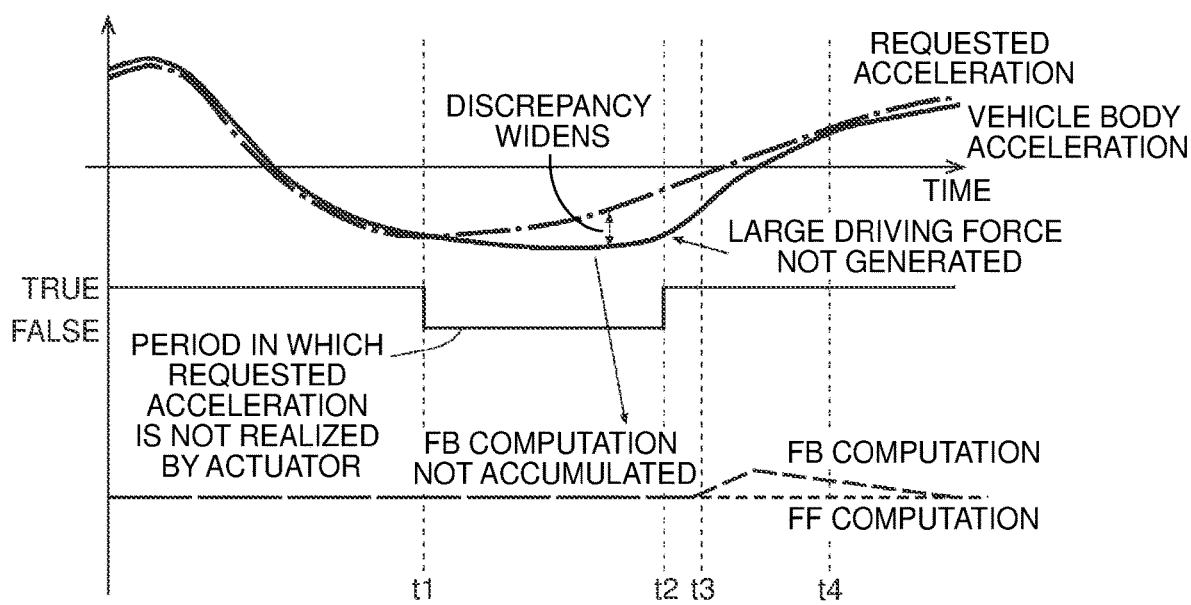

FIG. 4

CONTROL DEVICE, CONTROL METHOD, STORAGE MEDIUM, MANAGER, AND VEHICLE

CROSS-REFERENCE TO RELATED APPLICATION

This application claims priority to Japanese Patent Application No. 2021-027486 filed on Feb. 24, 2021, incorporated herein by reference in its entirety.

BACKGROUND

1. Technical Field

The present disclosure relates to a control device installed in a vehicle, a control method, a storage medium, a manager, and a vehicle.

2. Description of Related Art

Japanese Unexamined Patent Application No. 2020-032892 (JP 2020-032892A) discloses a control device (brake control electronic control unit (ECU)) capable of comprehensively managing requests accepted from a plurality of in-vehicle systems (application request units) that realize a driver assistance functions.

The control device in JP 2020-032892 A is described as having functions of comprehensively managing requests from the in-vehicle systems to a plurality of actuators, and functions of performing feedback control based on behavior of the vehicle with respect to the requests, and arbitrating a plurality of requests when requests are made to the actuators from the in-vehicle systems at the same time.

SUMMARY

In a control device that performs feedback control based on the behavior of the vehicle, when a request for a plurality of actuators is accepted from the in-vehicle system, when there are actuators that cannot respond so as to follow the request from feedback control performed based on the behavior of the vehicle, requests from feedback control (FB requests) are accumulated until the actuators are in a state of being capable of responding. In such a control device, at a timing at which the corresponding actuators are in a state ready to respond, the large FB request accumulated up to that point will be reflected in the behavior of the vehicle all at once, and accordingly the driver and other passengers might feel uncomfortable with the feedback control. Further, when such feedback control impedes operations requested by the driver, the driver might feel uncomfortable with the feedback control.

The present disclosure has been made in view of the above problems, and it is an object thereof to provide a control device and so forth that is capable of keeping the driver and other passengers from feeling uncomfortable with feedback control performed based on realization values in the vehicle.

An aspect of the present disclosure relates to a control device installed in a vehicle, the control device including one or more processors. The one or more processors are configured to: accept a plurality of first requests from a driver assistance system; perform arbitration of the first requests; calculate a second request that is a physical quantity that is different from the first requests, based on an arbitration result from the arbitration; calculate a third request that is the same physical quantity as the second request, based on a value realized by the vehicle and the first request; and distribute the second request and the third request to at least one of a plurality of actuator systems, wherein the one or more processors are configured to restrict calculation of the third request based on a predetermined condition.

An aspect of the present disclosure relates to a vehicle in which the described control device may be installed.

An aspect of the present disclosure relates to a manager installed in a vehicle. The manager includes: an accepting unit that accepts a plurality of kinematic plans from a plurality of advanced driver assistance systems applications; an arbitration unit that arbitrates the kinematic plans; a first calculation unit that calculates a first motion request based on an arbitration result by the arbitration unit; a second calculation unit that calculates a second motion request based on a value realized by the vehicle and the first motion request; and a distribution unit that distributes the first motion request and the second motion request to at least one of a plurality of actuator systems, wherein the second calculation unit restricts calculation of the second motion request based on a predetermined condition.

An aspect of the present disclosure relates to a control method executed by a computer of a manager installed in a vehicle. The control method includes: accepting a plurality of kinematic plans from a plurality of ADAS applications; performing arbitration of the kinematic plans; calculating a first motion request based on an arbitration result from the arbitration; calculating a second motion request based on a value realized by the vehicle and the first motion request; distributing the first motion request and the second motion request to at least one of a plurality of actuator systems; and restricting calculation of the second motion request based on a predetermined condition.

An aspect of the present disclosure relates to a computer-readable non-transitory storage medium storing a program. When executed by a computer of a manager installed in a vehicle, the program causes the computer to: accept a plurality of kinematic plans from a plurality of ADAS applications; perform arbitration of the kinematic plans; calculate a first motion request based on an arbitration result from the arbitration; calculate a second motion request based on a value realized by the vehicle and the first motion request; distribute the first motion request and the second motion request to at least one of a plurality of actuator systems; and restrict calculation of the second motion request based on a predetermined condition.

According to the present disclosure, the driver and other passengers can be kept from feeling uncomfortable with feedback control performed based on realization values in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart showing processing procedures of control executed by configurations of the control device;

FIG. 3 is a diagram showing an example of restriction conditions, and restriction contents when the restriction conditions are satisfied;

FIG. 4 is a timing chart describing control executed by the control device of the present embodiment.

DETAILED DESCRIPTION OF EMBODIMENTS

A control device of the present disclosure restricts computation of feedback control, performed in order to cause acceleration actually generated by a vehicle to follow acceleration requested by an in-vehicle system, during a period in which acceleration requested by the in-vehicle system is not being realized by actuators. Accordingly, deterioration of the ride quality of the vehicle and reduced sense of security and safety when the actuator resumes realization of the requested acceleration can be suppressed. An embodiment of the present disclosure will be described below in detail with reference to the drawings.

Embodiment

Configuration

Figure 1:
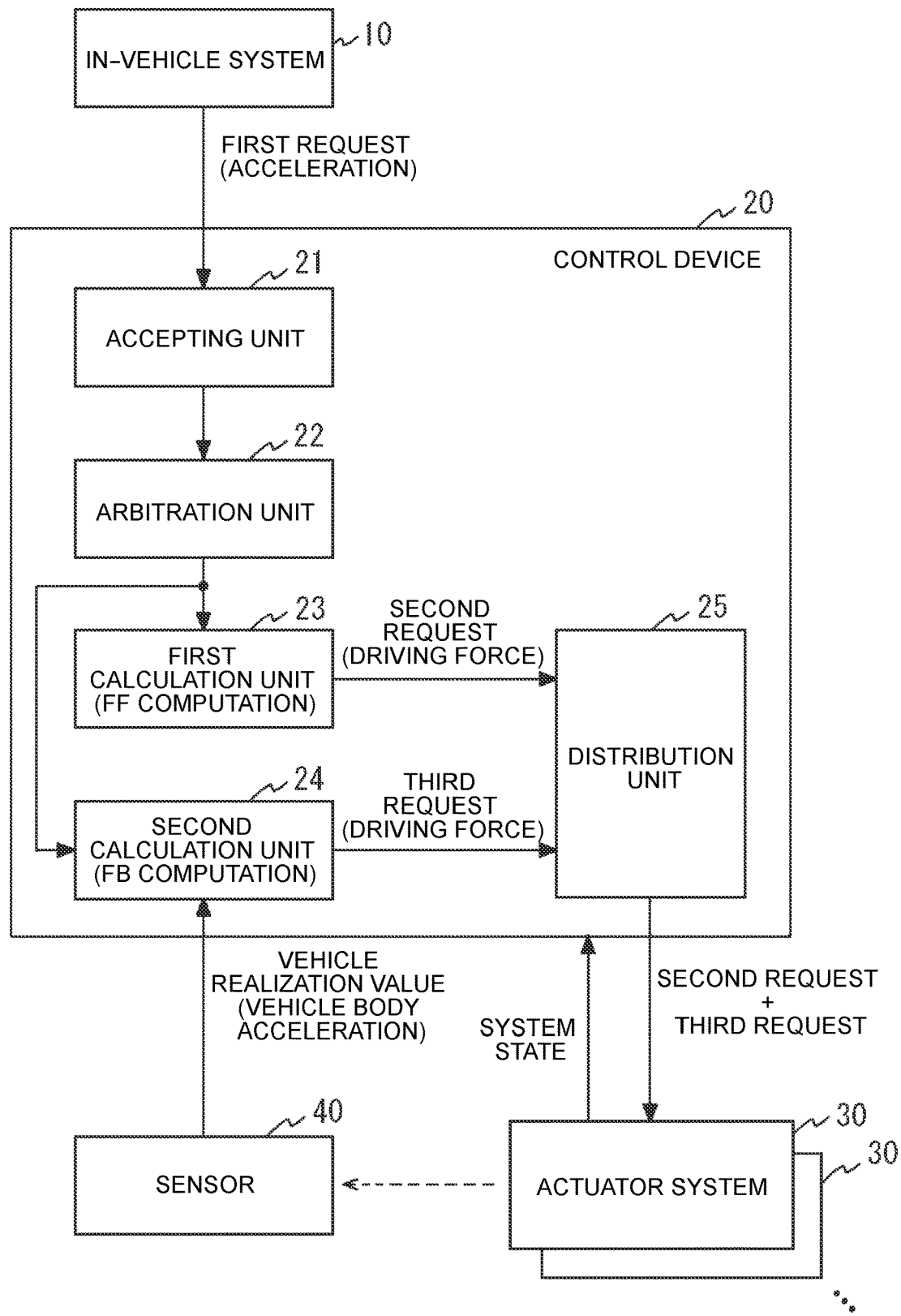
FIG. 1 is a functional block diagram of a control device installed in a vehicle according to an embodiment of the present disclosure, and peripheral portions thereof.

FIG. 1 is a functional block diagram of a control device 20 installed in a vehicle according to an embodiment of the present disclosure, and peripheral portions thereof. The functional block exemplified in FIG. 1 includes an in-vehicle system 10, the control device 20, a plurality of actuator systems 30, and a sensor 40. The in-vehicle system 10, the control device 20, the actuator systems 30, and the sensor 40 are communicably connected via an in-vehicle network such as a Controller Area Network (CAN) or Ethernet (registered trademark).

The in-vehicle system 10 is a system capable of outputting a request (first request) for acceleration (G) to be realized, to the control device 20. The in-vehicle system 10 is realized by a computer such as an electronic control unit (ECU) that has a processor such as a central processing unit (CPU), memory, and an input/output interface. An example of the in-vehicle system 10 is a driver assistance system that realizes various functions for assisting driving of the vehicle, including at least vehicle drive control and braking control, by executing predetermined applications.

Examples of applications implemented by the driver assistance system include an application that realizes automatic driving functions, an automatic parking application that realizes automatic parking functions, an advanced driver assistance systems (ADAS) application, and so forth. Advanced driver assistance systems applications include a plurality of ADAS applications that realize adaptive cruise control (ACC) functions of following a vehicle traveling ahead, applications that realize lane keeping assist (LKA) functions of maintaining lanes, applications that realize collision damage mitigation braking (automated emergency braking (AEB)) functions to reduce collision damage, and so forth. Note that the number of applications implemented in the driver assistance system is not limited in particular. Also, the driver assistance system may be configured of a plurality of ECUs, each provided for an application (e.g., an automatic driving ECU in which an automatic driving application is implemented, an automatic parking ECU in which an automatic parking application is implemented, and an ADAS-ECU in which an advanced driver assistance systems application is implemented). Also, a plurality of ADAS applications may be implemented in a plurality of devices, such as an ECU in which is implemented an ADAS application that realizes ACC functions, an ECU in which is implemented an ADAS application that realizes an LKA function, and an ECU in which is implemented an ADAS application that realizes an AEB function. Such a driver assistance system outputs requests for kinematic plans (forward or reverse acceleration/deceleration, etc.) that guarantee the functionality (merchantability) of the application alone, based on vehicle information acquired from various types of sensors and the like.

Each of the actuator systems 30 is a realization system for realizing the first request (kinematic plan request) output by the in-vehicle system 10. One of the actuator systems 30 includes a powertrain actuator capable of generating braking/driving force in the vehicle, and realizes the first request by acceleration or deceleration of the vehicle by controlling operations of the powertrain actuator. Examples of the power train actuator include an engine and a transmission (TM), and so forth. Another one of the actuator systems 30 includes a brake actuator capable of generating braking force in the vehicle, and realizes the first request by deceleration of the vehicle by controlling operations of the brake actuator. Examples of the brake actuator include an electric brake device and so forth. The actuator systems 30 can each output, to the control device 20, the system state including the operating state of the actuator and information indicating availability, which is the currently-operable performance range, and so forth.

Note that a steering actuator may be included as another one of the actuator systems 30. Also, one actuator system may be made up of a plurality of actuators.

The sensor 40 is a configuration to detect a value (vehicle realization value) realized by the vehicle in response to a request. The sensor 40 of the present embodiment is an acceleration sensor capable of detecting acceleration of the vehicle (vehicle body acceleration).

The control device 20 decides contents of control relating to the braking/driving of vehicle motion based on the first request (kinematic plan request) accepted from the in-vehicle system 10, the vehicle realization values acquired from the sensor 40, and the system state input from the actuator systems 30, and performs control based on the decided control content, by instructing the actuator systems 30 regarding the necessary braking/driving. The control device 20 functions as a so-called manager (ADAS manager (MGR) or a vehicle MGR or the like) involved in vehicle motion, or as part of a manager, and controls the movement of the vehicle. The control device 20 includes an accepting unit 21, an arbitration unit 22, a first calculation unit 23, a second calculation unit 24, and a distribution unit 25.

The accepting unit 21 accepts one or a plurality of first requests (kinematic plan requests) output by the in-vehicle system 10. The first request in the present embodiment is, for example, acceleration in the front-rear direction (longitudinal direction) of the vehicle that requests the vehicle for braking/driving force according to change in speed, which is output from an ADAS application that provides the ACC function for following a vehicle traveling ahead, and so forth.

The arbitration unit 22 arbitrates a plurality of first requests (kinematic plan requests) accepted from the in-vehicle system 10 by the accepting unit 21. Examples of the processing of this arbitration include one request being selected from the first requests based on a predetermined selection criterion, a new request being set based on the first requests, and so forth.

The first calculation unit 23 calculates a second request (first motion request), which is a physical quantity that is different from the first request (kinematic plan request), based on the arbitration results of the first request at the arbitration unit 22. This second request is computed for feedforward control of at least one of the actuator systems 30 (FF computation), based on the first request. The first calculation unit 23 of the present embodiment calculates the driving force as the second request, with respect to the first request which is acceleration. Thus, the requested acceleration is converted into a driving force for realizing the request.

The second calculation unit 24 calculates a third request (second motion request), which is a physical quantity that is different from the first request (kinematic plan request), based on the arbitration results of the first request at the arbitration unit 22 and the vehicle realization values acquired from the sensor 40. This third request is computed for feedback control at least one of the actuator systems 30 (FB computation), based on the arbitration results of the first request and the realization values. This third request is the driving force, in the same way as with the second request. More specifically, the second calculation unit 24 compares the acceleration obtained this time by arbitration by the arbitration unit 22 (requested acceleration) with the acceleration generated in the vehicle in accordance with the driving force realized by the actuator system 30 following the previous arbitration results (vehicle body acceleration), and calculates a third request necessary to resolve discrepancy between the requested acceleration and the vehicle body acceleration, to realize the requested acceleration. In calculating this third request, so-called disturbances, such as road surface gradient or road surface conditions acquired from in-vehicle equipment or sensors that are omitted from illustration, and system state input from the actuator systems 30, are taken into consideration.

The distribution unit 25 inputs the second request calculated by the first calculation unit 23 and the third request calculated by the second calculation unit 24, and distributes the second request and the third request to at least one of the actuator systems 30 as motion requests. Note that when the configuration includes a plurality of actuators in one actuator system, the second request and the third request are distributed to at least one of the actuators in the actuator system. Thus, the control device 20 performs control of the actuator systems 30 regarding braking/driving for vehicle motion that is necessary.

Note that the second request and the third request may be driving torque instead of driving force. Further, the second request and the third request may be left as driving force, with the driving force being converted into driving torque by the actuator systems 30.

Note that the configurations of the equipment installed in the vehicle and the configuration of the control device 20 described above are exemplary, and additions, substitutions, changes, omissions, and so forth, can be made as appropriate. Also, the functions of each piece of equipment can be implemented by integration into one piece of equipment or distribution between or among a plurality of pieces of equipment, as appropriate.

Control

The control executed by the control device 20 according to the present embodiment will be described with reference to FIGS. 2 and 3. FIG. 2 is a flowchart showing control processing procedures executed by the arbitration unit 22, the first calculation unit 23, and the second calculation unit 24 of the control device 20.

The control shown in FIG. 2 is started when the accepting unit 21 of the control device 20 accepts the first request (acceleration) from the in-vehicle system 10.

Step S201

The arbitration unit 22 arbitrates the first requests (acceleration) accepted by the accepting unit 21. Once arbitration is performed, the processing proceeds to step S202.

Step S202

The first calculation unit 23 calculates the second request (driving force) based on the result (requested acceleration) arbitrated by the arbitration unit 22. Once the second request is calculated, the processing proceeds to step S203.

Step S203

The second calculation unit 24 determines whether the vehicle satisfies a restriction condition. This restriction condition is a predetermined condition that defines the state of the vehicle for which the computation of feedback control (FB computation) for calculating the third request should be restricted. FIG. 3 is a diagram showing an example of restriction conditions and restriction contents when the restriction conditions are satisfied.

The restriction conditions exemplified in FIG. 3 include whether an actuator has failed, whether the actuator can immediately respond to the driving force output by the control device 20, and whether the actuator can respond to the driving force output by the control device 20, whether the vehicle is stopped, whether the vehicle state is stable, whether the driver is performing operations, the magnitude relation between a request based on driver operations and the second request, whether the request based on driver operations can be realized by the actuator system 30, and so forth. Whether the actuator has failed can be determined based on the system state acquired from the actuator system 30 and so forth. Whether the vehicle is stopped, whether the vehicle state is stable, and whether the driver is performing operations can be determined based on various information acquired from in-vehicle devices that are omitted from illustration. Regarding the magnitude relation between a request based on driver operations and the second request, both requests can be compared to make determination based on which request should be selected (which one is superior in terms of control), or the like.

[1] When there is no failure of the actuator, the actuator is capable of responding immediately, the vehicle state is stable, and the driver is performing operations, computation of feedback control (FB computation) for a request that would obstruct the driver operations is stopped. As a specific example, when the request based on the driver operations that is a driver request is larger than the second request that is a system request, and can be realized by the actuator system 30, computation of feedback control (FB computation) for a request that would obstruct driver operations is stopped. Thus, occurrence of vehicle behavior contrary to the intentions of operations performed by the driver can be suppressed.

[2] When there is no failure of the actuator, the actuator can respond immediately, and the vehicle state is unstable, computation of all feedback control (FB computation) is stopped. Unstable vehicle states can be determined by a function for stabilizing the vehicle (stabilization control of the chassis, etc.) intervening with the actuator, in a situation in which an anti-lock braking system (ABS), a traction control (TRC) function, a vehicle stability control (VSC) function, or the like, is operating. Thus, stabilization of vehicle behavior can be realized with highest priority (safety first).

[3] When there is no failure of the actuator, the actuator cannot respond immediately, and the vehicle is in a non-stopped state in which the vehicle is not stopped, gain used for computation of feedback control (FB computation) is temporarily reduced (note that feedback control continues to be performed). The inability of the actuator to respond immediately can be determined by, for example, electrical factors such as when communication is temporarily interrupted or before an abnormal state of a sensor value is finalized, or mechanical factors such as a state in which drive force is not being realized at the tire point (e.g., while shifting gears, transitioning through fuel-cut (FC), transitioning through lockup (LU)), and so forth. Thus, the amount of change in the front-rear acceleration of the vehicle can be reduced. As an example, this decrease in gain is performed only during a period when response of the actuator is delayed.

[4] When there is no failure of the actuator, the actuator cannot respond immediately, and the vehicle is stopped, computation of all feedback control (FB computation) is stopped. Accordingly, unnecessary accumulation processing of the third request (FB request) by feedback control while the vehicle is stopped does not have to be performed.

[5] When any one of the actuators has failed and the actuator is not even capable of responding, the computation of feedback control (FB computation) for the driving force regarding the failed actuator is stopped. Failure of the actuator can be determined when the actuator malfunctions or the like. On the other hand, computation of the feedback control for driving force regarding actuators that have not failed continues to be performed. Thus, even when one of the actuators fails, the remaining actuators can compensate for the request regarding which the failure has occurred, as far as possible.

When determining that the vehicle satisfies the restriction conditions (YES in step S203), the processing proceeds to step S204, and when determining that the vehicle does not satisfy the restriction conditions (NO in step S203), the processing proceeds to step S205.

Step S204

The second calculation unit 24 performs computation of feedback control (FB computation) based on the requested acceleration and vehicle body acceleration, giving consideration to the restriction contents associated with the restriction conditions satisfied, and calculates the third request (driving force). For example, when the restriction contents are gain specification for computation of feedback control, the third request corrected in accordance with gain is calculated, and when the restriction contents are to stop computation of feedback control, the value zero is calculated as the third request. Once the third request is calculated, the processing proceeds to step S206.

Step S205

The second calculation unit 24 calculates the third request (driving force) by performing computation of feedback control (FB computation) based on the requested acceleration and the vehicle body acceleration, without restriction. Once the third request is calculated, the processing proceeds to step S206.

Step S206

The first calculation unit 23 and the second calculation unit 24 output the respectively calculated second request (driving force) and third request (driving force) to the distribution unit 25. A request obtained by adding the second request and the third request (second request+third request) is the driving force for realizing the requested acceleration. Thus, this control ends.

Note that the processing of step S202 for calculating the second request and the processing of steps S203 to S205 for calculating the third request may be performed in a reverse order, or in parallel.

An example of the processing based on the control of the present embodiment described above will be described with reference to a timing chart in FIG. 4. In the upper graph in FIG. 4, the requested acceleration is indicated by a long dashed short dashed line, and the vehicle body acceleration is indicated by a continuous line. The graph at the middle of FIG. 4 shows whether the request based on the driver operations is realized by the actuator system 30 (whether the requested acceleration is being realized by the actuator), by logical values. The lower part of FIG. 4 schematically shows the accumulation of the driving force (third request) by FB computation and the FF computation. In FIG. 4, during the period in which the requested acceleration is realized by the actuator, before time t1, the vehicle body acceleration is controlled following the requested acceleration. Thereafter, in a period from time t1 to time t2 in which the requested acceleration is not realized by the actuator, the discrepancy between the vehicle body acceleration and the requested acceleration gradually increases, but accumulation of driving force (third request) by computation of feedback control (FB computation) is not performed. Hence, a large driving force is not generated even when the requested acceleration comes to be realized by the actuator at time t2 (when realization is resumed), and the requested driving force with respect to the vehicle body acceleration can be suppressed. Thus, the vehicle body acceleration can be gradually brought closer to the requested acceleration over time t3 to t4 without increasing the discrepancy. Accordingly, deterioration of the ride quality of the vehicle and reduced sense of security and safety when the actuator resumes realization of the requested acceleration can be reduced.

Figure 5:
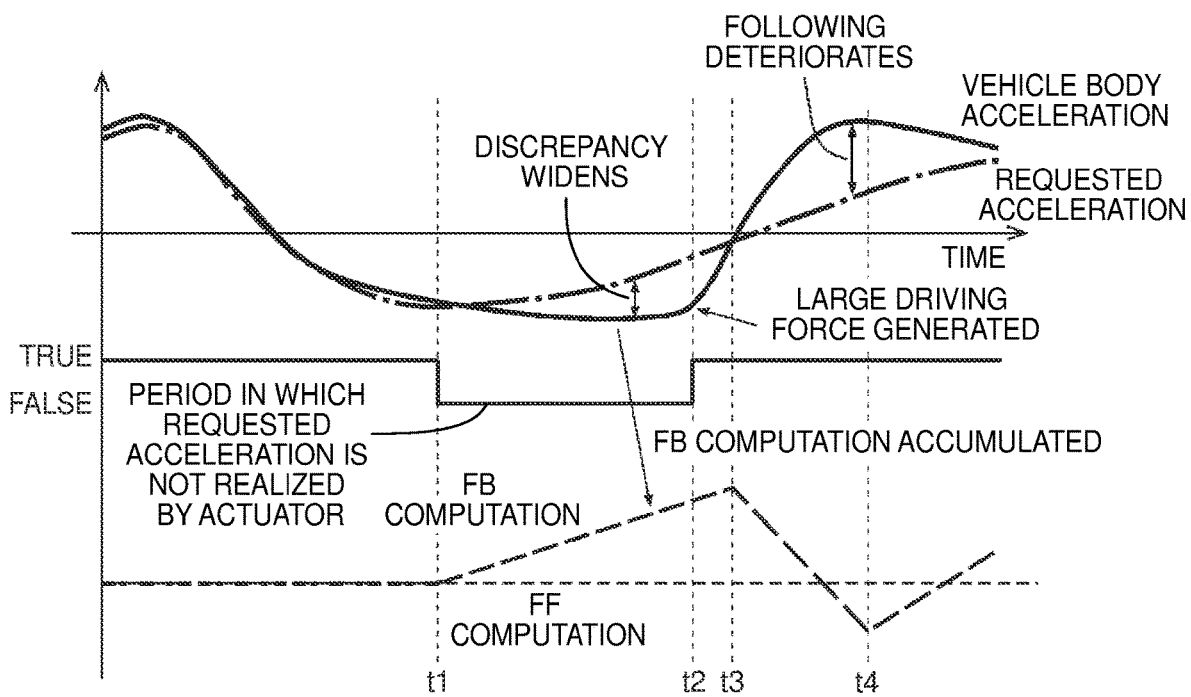
FIG. 5 is a timing chart describing control executed by a conventional control device.

FIG. 5 shows a timing chart for processing based on conventional control, for comparison. In the upper graph in FIG. 5, the requested acceleration is indicated by a long dashed short dashed line, and the vehicle body acceleration is indicated by a continuous line. The graph in the middle of FIG. 5 shows whether the requested acceleration is realized, by a logical value. The lower part of FIG. 5 schematically shows the accumulation of the driving force (third request) by FB computation and FF computation. In conventional control, in a period from time t1 to time t2 in which the requested acceleration is not realized by the actuator, accumulation of driving force (third request) by computation of feedback control (FB computation) is performed in accordance with the discrepancy between the vehicle body acceleration and the requested acceleration, as illustrated in FIG. 5. Accordingly, when the requested acceleration is realized by the actuator at the time t2 (when realization is resumed), a large driving force is undesirably generated, and the capability of the vehicle body acceleration to follow the requested acceleration deteriorates. This leads to abrupt acceleration and deterioration of riding comfort, which makes the driver and other passengers uncomfortable.

Operations and Effects

As described above, the control device according to an embodiment of the present disclosure restricts computation of feedback control (FB computation), performed in order to cause vehicle body acceleration actually generated by the vehicle to follow acceleration requested by the in-vehicle system, during a period in which acceleration requested by the in-vehicle system is not being realized by actuators. By this control, during the period in which the requested acceleration from the in-vehicle system is not realized by the actuators, the request by the computation of feedback control (FB computation) in accordance with the discrepancy between the vehicle body acceleration and the requested acceleration is not accumulated, or the request is accumulated less than in the period realized by the actuator, a large driving force is not generated when the requested acceleration is realized by the actuator, and the requested driving force with respect to the vehicle body acceleration can be suppressed.

Thus, according to the control device of the present embodiment, deterioration of the ride quality of the vehicle and reduced sense of security and safety when the actuator resumes realization of the requested acceleration can be suppressed, and the driver and other passengers can be kept from feeling uncomfortable. Also, according to the control device of the present embodiment, control with respect to the discrepancy between the requested acceleration and the vehicle body acceleration can be started quicker than conventionally, and accordingly responsivity is also improved.

Although an embodiment of the technology of the present disclosure is described above, the present disclosure can be understood not only as a control device but also as a control method that is executed by a control device including a processor and memory, a control program, a computer-readable non-transitory storage medium in which is recorded the control program, a manager, a vehicle provided with the control device, and so forth.

The present disclosure is useful for control devices installed in vehicles and so forth.

What is claimed is:

1. A vehicle comprising:
a plurality of actuator systems configured to control motion of the vehicle in at least a front-rear direction of the vehicle;
a driver assistance system that issues a plurality of first requests relating to acceleration/deceleration of the vehicle in the front-rear direction of the vehicle, the driver assistance system including a plurality of advanced driver assistance systems applications each of which issues a corresponding one of the plurality of first requests, the plurality of advanced driver assistance systems applications including at least two of (i) an adaptive cruise control application, (ii) a lane keeping assist application, and (iii) an automated emergency braking application; and
a control device coupled to the plurality of actuator systems and the driver assistance system, the control device including one or more processors configured to:
accept the plurality of first requests from the driver assistance system;
perform arbitration of the first requests;
calculate a second request based on an arbitration result from the arbitration of the first requests, the second request indicating a driving force or a driving torque;
calculate a third request based on a sensed value relating to motion of the vehicle and based on the arbitration result from the arbitration of the first requests, the third request indicating the driving force or the driving torque that is calculated using feedback control that considers the sensed value relating to the motion of the vehicle; and
distribute the second request and the third request to at least one of the plurality of actuator systems of the vehicle, which then controls the motion of the vehicle based on the distributed requests,
wherein the one or more processors are configured to restrict the use of the feedback control in the calculation of the third request when the at least one of the actuator systems to which the second and third requests are distributed is not able to respond to the distributed requests.

2. The control device according to claim 1, wherein the actuator system that is able to respond to the distributed requests is able to adjust an actual value that is a physical quantity output by the actuator system, such that a difference between the actual value and a requested value that is a physical quantity corresponding to the distributed requests is reduced.

3. A vehicle comprising:
a plurality of actuator systems configured to control motion of the vehicle in at least a front-rear direction of the vehicle;
a plurality of advanced driver assistance systems applications that issue a plurality of kinematic plans relating to acceleration/deceleration of the vehicle in the front-rear direction of the vehicle, each of the plurality of advanced driver assistance systems applications issuing a corresponding one of the plurality of kinematic plans, the plurality of advanced driver assistance systems applications including at least two of (i) an adaptive cruise control application, (ii) a lane keeping assist application, and (iii) an automated emergency braking application; and
a manager coupled to the plurality of actuator systems and the plurality of advanced driver assistance systems applications, the manager comprising one or more processors configured to:
accept the plurality of kinematic plans from the plurality of advanced driver assistance systems applications;
arbitrate the kinematic plans;
calculate a first motion request based on a result of the arbitration of the kinematic plans, the first motion request indicating a driving force or a driving torque;
calculate a second motion request based on a sensed value relating to motion of the vehicle and the first motion request, the second motion request indicating the driving force or the driving torque that is calculated using feedback control that considers the sensed value relating to the motion of the vehicle; and
distribute the first motion request and the second motion request to at least one of the plurality of actuator systems of the vehicle, which then controls the motion of the vehicle based on the distributed requests,
wherein the use of the feedback control in the calculation of the second motion request is restricted when the at least one of the actuator systems to which the first and second motion requests are distributed is not able to respond to the distributed requests.

4. A control method of a vehicle that includes (i) a plurality of actuator systems configured to control motion of the vehicle in at least a front-rear direction of the vehicle, (ii) a plurality of advanced driver assistance systems applications that issue a plurality of kinematic plans relating to acceleration/deceleration of the vehicle in the front-rear direction of the vehicle, each of the plurality of advanced driver assistance systems applications issuing a corresponding one of the plurality of kinematic plans, the plurality of advanced driver assistance systems applications including at least two of (i) an adaptive cruise control application, (ii) a lane keeping assist application, and (iii) an automated emergency braking application, and (iii) a computer coupled to the plurality of actuator systems and the plurality of advanced driver assistance systems applications, the control method being executed by the computer and comprising:
- accepting the plurality of kinematic plans from the plurality of advanced driver assistance systems applications;
- performing arbitration of the kinematic plans;
- calculating a first motion request based on an arbitration result from the arbitration of the kinematic plans, the first motion request indicating a driving force or a driving torque;
- calculating a second motion request based on a sensed value relating to motion of the vehicle and the first motion request, the second motion request indicating the driving force or the driving torque that is calculated using feedback control that considers the sensed value relating to the motion of the vehicle;
- distributing the first motion request and the second motion request to at least one of the plurality of actuator systems of the vehicle, which then controls the motion of the vehicle based on the distributed requests; and
- restricting the use of the feedback control in the calculation of the second motion request when the at least one of the actuator systems to which the first and second motion requests are distributed is not able to respond to the distributed requests.

* * * * *